United States Patent [19]

Ott et al.

[11] Patent Number: 5,533,347
[45] Date of Patent: Jul. 9, 1996

[54] METHOD OF REFRIGERATION CASE CONTROL

[75] Inventors: James H. Ott, Akron; Mark E. Anglin, Wadsworth; James P. Henderson, Tallmadge, all of Ohio

[73] Assignee: Novar Electronics Corporation, Barberton, Ohio

[21] Appl. No.: 396,698

[22] Filed: Mar. 1, 1995

Related U.S. Application Data

[63] Continuation-in-part of Ser. No. 173,614, Dec. 22, 1993, Pat. No. 5,460,008.

[51] Int. Cl.$^6$ ............................................. F25B 41/00
[52] U.S. Cl. ............................. 62/115; 62/212; 236/78.D
[58] Field of Search ................... 236/78 X; 62/115, 62/212 X

[56] References Cited

U.S. PATENT DOCUMENTS

| | | | |
|---|---|---|---|
| 4,183,223 | 1/1980 | Alsenz | 62/80 |
| 4,523,435 | 6/1985 | Lord | 236/78 X |
| 4,531,376 | 7/1985 | Alsenz | 62/156 |
| 4,535,602 | 8/1985 | Alsenz et al. | 62/175 |
| 4,537,038 | 8/1985 | Alsenz et al. | 62/140 |
| 4,578,959 | 4/1986 | Alsenz | 62/140 |
| 4,593,533 | 6/1986 | Alsenz | 62/140 |
| 4,612,776 | 9/1986 | Alsenz | 62/175 |
| 4,628,700 | 12/1986 | Alsenz | 62/152 |
| 4,633,672 | 1/1987 | Persem et al. | 62/126 |
| 4,651,535 | 3/1987 | Alsenz | 62/225 |
| 4,679,404 | 7/1987 | Alsenz | 62/175 |
| 4,686,835 | 8/1987 | Alsenz | 62/223 |
| 4,697,431 | 10/1987 | Alsenz | 62/225 |
| 4,735,060 | 4/1988 | Alsenz | 62/225 |
| 4,825,662 | 5/1989 | Alsenz | 62/117 |
| 4,831,832 | 5/1989 | Alsenz | 62/117 |
| 4,918,932 | 4/1990 | Gustafson et al. | 236/78 X |
| 4,951,475 | 8/1990 | Alsenz | 62/117 |
| 5,050,397 | 9/1991 | Sugiyama et al. | 62/175 |
| 5,191,643 | 3/1993 | Alsenz | 395/155 |
| 5,428,966 | 7/1995 | Alsenz | 62/116 |
| 5,444,987 | 8/1995 | Alsenz | 62/116 |

Primary Examiner—William E. Wayner
Attorney, Agent, or Firm—Bliss McGlynn

[57] ABSTRACT

A method of controlling a refrigeration case of a refrigeration system including the steps of locating an expansion valve of a refrigeration case, moving the expansion valve of the refrigeration case out of a predetermined position, sampling temperature readings from an evaporator coil of a refrigeration case, calculating an adaptive proportional-integral-differential (PID) of the temperature of the evaporator coil for the refrigeration case, and moving the expansion valve to a second position closer to the predetermined position based on the calculated proportional-integral-differential until the temperature of the evaporator coil for the refrigeration case is within a predetermined temperature range.

27 Claims, 11 Drawing Sheets

METHOD OF REFRIGERATION CASE CONTROL

CROSS-REFERENCE TO RELATED APPLICATION(S)

This application is a Continuation-in-Part of U.S. patent application Ser. No. 08/173,614, filed Dec. 22, 1993, now U.S. Pat. No. 5,460,008.

BACKGROUND OF THE INVENTION

1. Field of the Invention

The present invention relates generally to refrigeration systems and, more specifically, to a method of refrigeration case control.

2. Description of the Related Art

A conventional refrigeration system includes a compressor for compressing refrigerant vapor and discharging it into a condenser. The condenser liquifies the refrigerant which flows into a receiver. From the receiver, the liquid refrigerant flows through a heat exchanger and through a thermostatic expansion valve. The expansion valve expands the liquid refrigerant into a vapor which flows into and through an evaporator. Passing through the evaporator, the expanded refrigerant absorbs heat from a refrigeration case, aided by a circulating fan, and then returns to the compressor.

Typically, the refrigeration system includes a plurality of refrigeration cases and compressors. The compressors are commonly piped together to form a compressor rack and pressure detection sensors are used for establishing and detecting a compressor suction pressure range in the refrigeration system for determining when upper (cut-in) and lower (cut-out) limits of the compressor suction pressure range have been exceeded. The refrigeration system uses a logic circuit for turning or cycling the compressors ON and OFF in succession or stages when the limits are exceeded to bring the compressor suction pressure within the compressor suction pressure range.

One disadvantage of the above refrigeration system is that the cut-in and cut-out limits provide only a coarse control of the compressor rack in the compressor suction pressure range. As a result, the compressors of the compressor rack may be cycled frequently, resulting in a shorter life for the compressors. Another disadvantage is that the cycling of the compressors may cause the compressor suction pressure to rise or fall too quickly, resulting in excessive condenser cycling. Therefore, there is a need in the art to control each refrigeration case load to regulate the compressor rack only when the refrigeration cases cannot maintain control.

Traditionally, control of the refrigeration case load employed maintaining a temperature differential such as ten degrees (10°) across the evaporator coil of the refrigeration case. The method of control used a thermostatic expansion valve to control the amount of refrigerant through the evaporator coil. Although this method of control worked well for large temperature differentials across the evaporator coil, it suffered from the disadvantage that the method could not be used to maintain small temperature differentials such as less than ten degrees (10°) across the evaporator coil. Also, the method could not be used on analog expansion valves. Further, the method produced poor results if there was liquid refrigerant in the evaporator coil. Therefore, there is a need in the art to control each refrigeration case load within a relatively small temperature range.

SUMMARY OF THE INVENTION

It is, therefore, one object of the present invention to provide a method of refrigeration case synchronization for compressor optimization.

It is another object of the present invention to provide a method of controlling each refrigeration case load to regulate a compressor rack only when the compressors cannot maintain control.

It is yet another object of the present invention to increase the amount of time between switching ON or OFF the next stage of a compressor rack.

It is still another object of the present invention to provide a method of refrigeration case control.

It is still another object of the present invention to provide a method of refrigeration case control which controls the refrigeration case load within a small temperature differential across the evaporator coil of the refrigeration case.

It is a further object of the present invention to provide a method of refrigeration case control which is self-tuning or adaptive.

It is yet a further object of the present invention to provide a method of refrigeration case control which controls an analog servo expansion valve.

To achieve the foregoing objects, the present invention is a method of controlling a plurality of commonly piped compressors for a refrigeration system having a plurality of refrigeration cases. The method includes the steps of sensing a suction pressure of the refrigeration system, determining whether the sensed suction pressure is within a predetermined range, and turning compressors ON or OFF in stages until the suction pressure is within the predetermined pressure range. The method also includes the steps of sensing a case temperature for each of the refrigeration cases if the sensed suction pressure is within the predetermined pressure range and determining whether the sensed case temperature is within a predetermined temperature range. The method further includes the steps of turning selectively the load of the refrigeration cases ON and OFF until the case temperature is within the predetermined temperature range if the sensed case temperature is not within the predetermined temperature range and ending the method if the sensed case temperature is within the predetermined temperature range.

Additionally, the present invention is a method of controlling a refrigeration case of a refrigeration system including the steps of locating an expansion valve of a refrigeration case, moving the expansion valve of the refrigeration case out of a predetermined position and sampling of a refrigeration case. The method also includes the steps of calculating an adaptive proportional-integral-differential (PID) of the temperature of the evaporator coil for the refrigeration case and moving the expansion valve to a second position closer to the predetermined position based on the calculated proportional-integral-differential until the temperature of the evaporator coil for the refrigeration case is within a predetermined temperature range.

One advantage of the present invention is that a method is provided for refrigeration case synchronization for compressor optimization in a refrigeration system. Another advantage of the present invention is that a method is provided for controlling each case load to regulate the compressor rack only when the compressors cannot maintain control. Yet another advantage of the present invention is that the amount of time may be increased between switching ON and OFF the next stage of the compressor rack by using the deadband area of control within each refrigeration case load to regulate only when the compressors cannot maintain control. Still another advantage of the present invention is that the synchronization method uses a proportion of those refrigeration case deadbands to define its input variables as to when it should inhibit cooling of refrigeration cases or accelerate cooling in those refrigeration cases to moderate the changes that would cause compressors to stage up or down. A further advantage of the present invention is that a method is provided of refrigeration case control that controls the refrigeration case load by maintaining a small differential such as ± one degree (1°) across an evaporator coil of the refrigeration case. Yet a further advantage of the present invention is that the method of refrigeration case control is used to control an analog servo expansion valve as opposed to a pulse or thermostatic expansion valve. A still further advantage of the present invention is that the method of refrigeration case control uses two fast Fourier transforms to position the expansion valve, thereby making the method adaptive.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
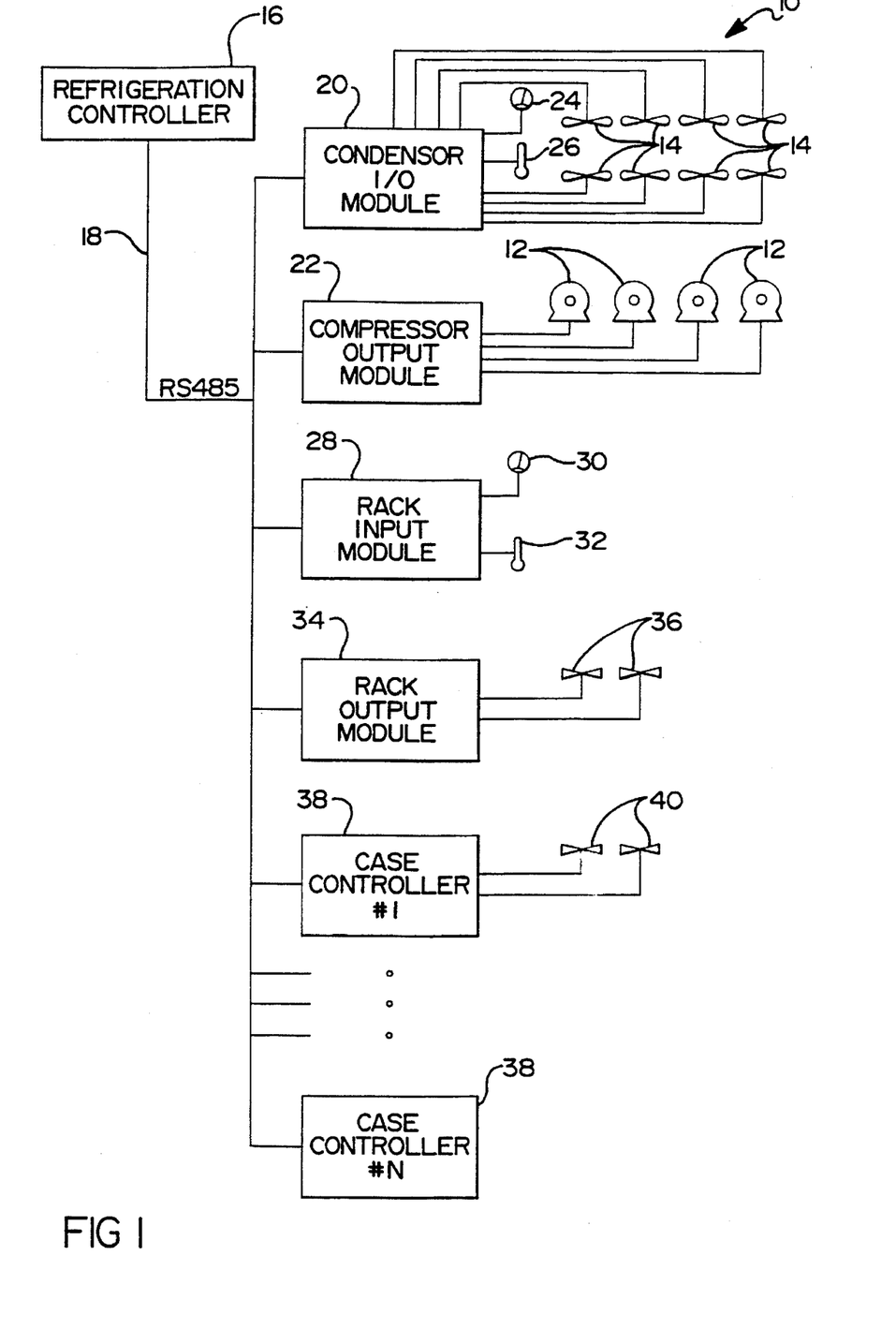
FIG. 1 is a block diagram of a refrigeration system.

Referring to FIG. 1, a refrigeration system 10 is shown. The refrigeration system 10 includes a plurality of refrigeration cases (not shown) whose capacity or load is controlled by a rack of compressors 12 which are parallel-staged and commonly piped to produce a common compressor suction pressure and temperature. The refrigeration system 10 also includes a plurality of condenser fans 14 for condensers (not shown) of the refrigeration system. The refrigeration system 10 includes a refrigeration controller 16, a communications bus (RS-485) 18 connected to the refrigeration controller 16, a condenser input/output (I/O) module 20 interconnecting the communications bus 18 and condenser fans 14, and a compressor output module 22 interconnecting the communications bus 18 and the rack of compressors 12. The refrigeration system 10 also includes a pressure sensor 24 and temperature sensor 26 attached to the condensers of the refrigeration system 10 and connected to the condenser I/O module 20 for sensing or measuring the pressure and temperature, respectively, of the refrigerant in the condensers of the refrigeration system 10. It should be appreciated that the refrigeration controller 16, communications bus 18, condenser I/O module 20 and compressor output module 22 are conventional and known in the art.

The refrigeration system 10 further includes a rack input module 28 connected to the communications bus 18 and a pressure sensor 30 and a temperature sensor 32 attached to the compressor suction line (not shown) and connected to the rack input module 28 for sensing or measuring the pressure and temperature, respectively, for the rack of compressors 12. The refrigeration system 10 includes a rack output module 34 connected to the communications bus 18 and a plurality of shut-off valves and defrost coils 36 for the refrigeration cases connected to the rack output module 34. The refrigeration system 10 also includes a plurality of case controllers 38 connected to the communications bus 18 and a plurality of expansion valves 40 for the refrigeration cases connected to the case controllers 38. Preferably, the expansion valve 40 is of an analog servo type as is known in the art. It should be appreciated that each refrigeration case has an evaporator, shut-off valve, defrost coil, expansion valve, etc. as is known in the art.

Figure 2:
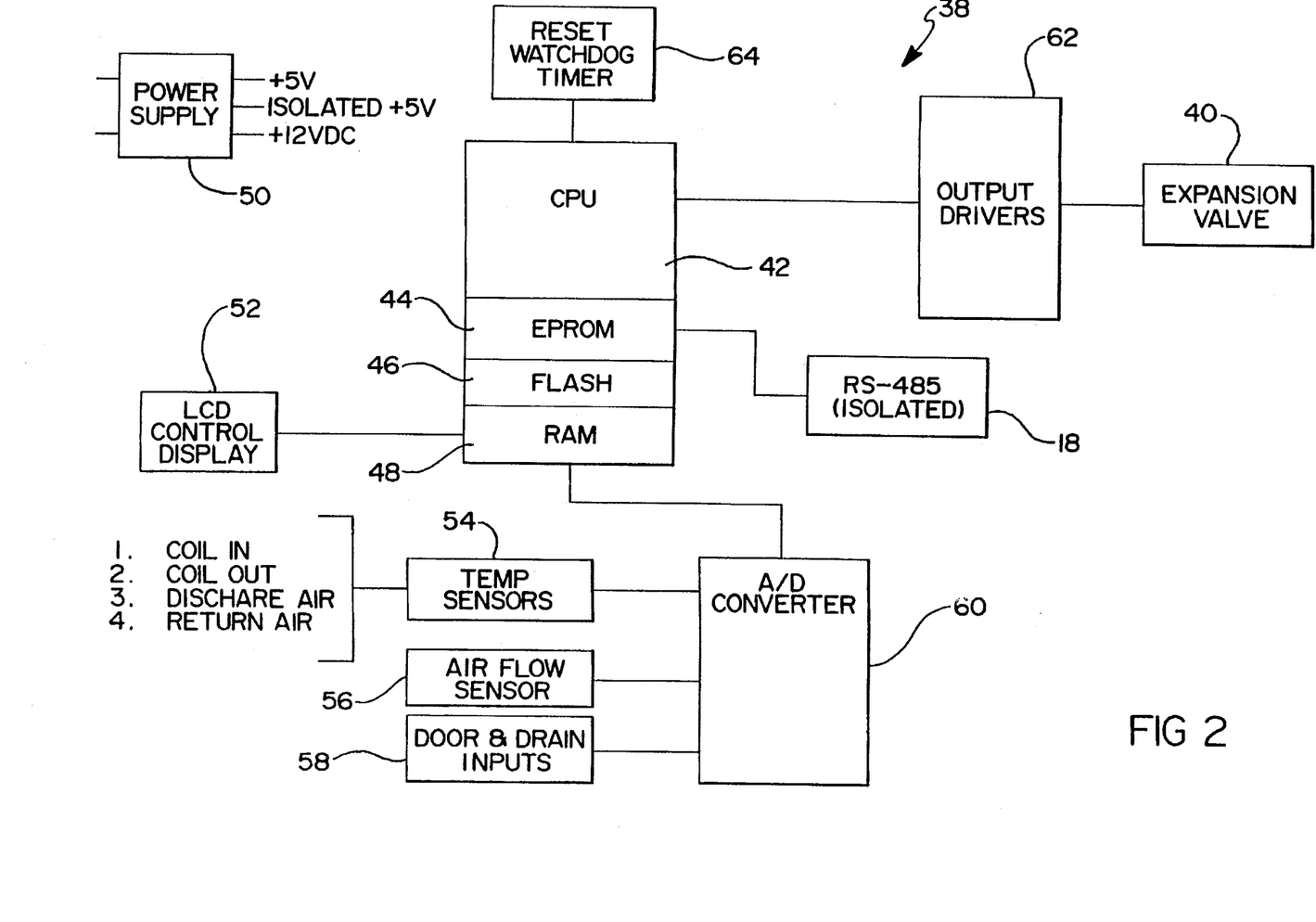
FIG. 2 is a block diagram of a case controller of FIG. 1.

Referring to FIG. 2, each case controller 38 includes a central processing unit (CPU) 42 and memory such as electronically programmable read only memory (EPROM) 44, flash memory 46 and random access memory 48. The case controller 38 also includes a power supply 50 which is connected to a source of power (not shown) and provides a plurality of voltage outputs to the case controller 38. The case controller 38 further includes a liquid crystal display (LCD) 52 for visually indicating output from the case controller 38 to an operator.

Each case controller 38 also includes a plurality of sensors for inputting data or information into the case controller 38. Specifically, the case controller 38 includes temperature sensors 54 for sensing the temperature of the refrigerant for the evaporator coil in, evaporator coil out, discharge air and return air of each refrigeration case. The case controller 38 also includes an air flow sensor 56 for measuring the air flow of the discharge and return air of each refrigeration case. The case controller 38 further includes door and drain sensors 58 for sensing whether the case door is open and whether fluid is draining from the refrigeration case. The case controller 38 also includes an analog to digital (A/D) converter 60 interconnecting the sensors 54,56,58 and the case controller 38. The case controller 38 further includes output drivers 62 connected to the CPU 42 and the expansion valves 40. It should be appreciated that each case controller 38 controls the opening and closing of one expansion valve 40.

The case controller 38 is connected to the communications bus 18 and has a reset watchdog timer 64 connected to the CPU 42 for resetting the CPU 42. It should be appreciated that the components of the case controller 38 are conventional and known in the art.

Figure 3A:
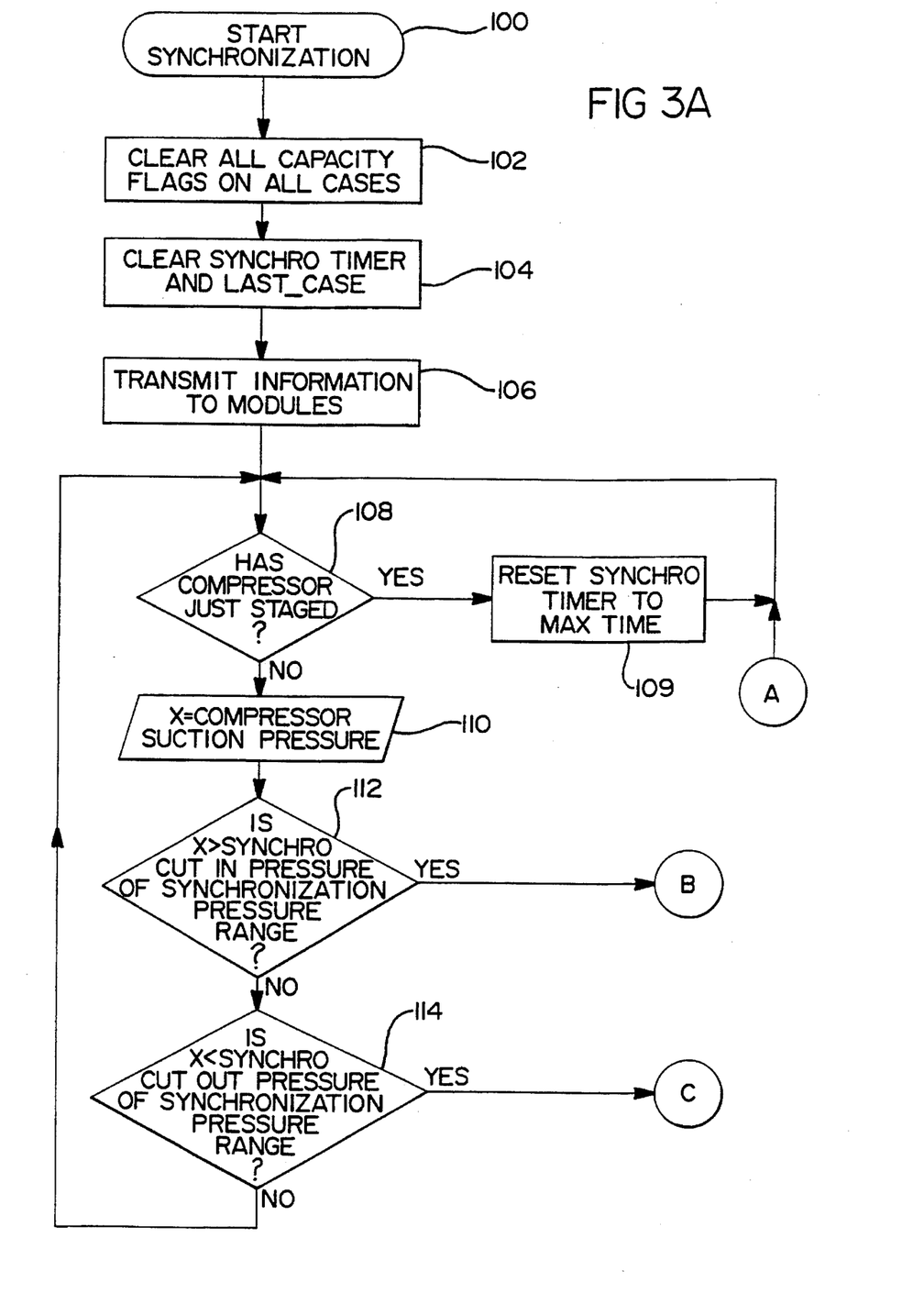
FIGS. 3A through 3E are flowcharts of a method, according to the present invention, of controlling the refrigeration system of FIG. 1.
Figure 3B:
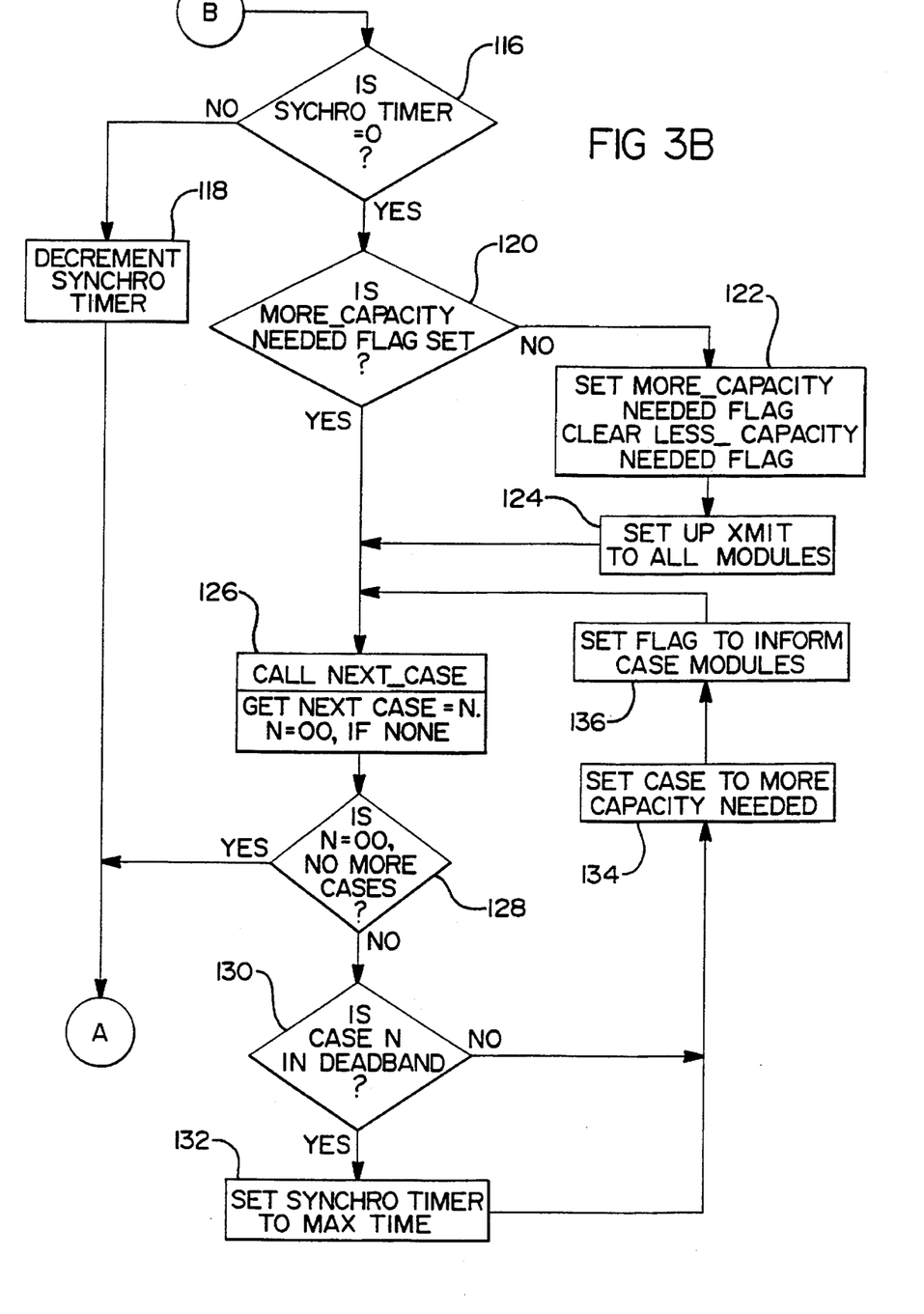
Figure 3C:
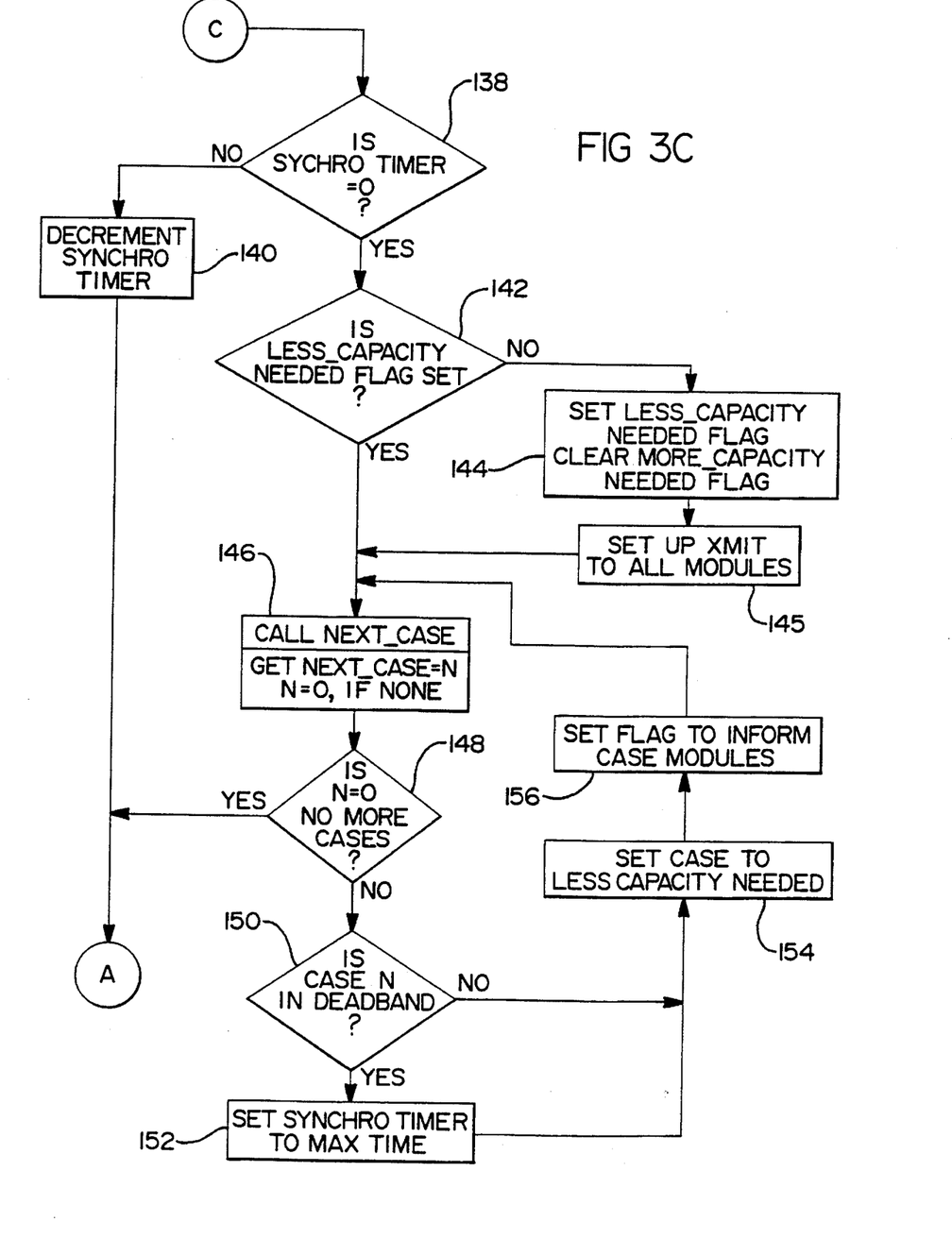

Referring to FIGS. 3A through 3C, a method of refrigeration case synchronization for compressor optimization, according to the present invention, is shown. It should be appreciated that the upper (cut-in) and lower (cut-out) limits of the compressor suction pressure are programmed in the refrigeration controller 16 and that the upper and lower limits of the case temperature for each refrigeration case is programmed into the case controller 38 of each refrigeration case. It should also be appreciated that other predetermined values such as a predetermined compressor suction pressure are programmed into the refrigeration controller 16 and/or case controller 38.

As illustrated in FIGS. 3A through 3C, the methodology starts in bubble 100 and advances to block 102. In block 102, the methodology clears all capacity flags on all refrigeration cases. The capacity flags are used to indicate that a particular refrigeration case needs more or less cooling or capacity to regulate the load on that refrigeration case.

The methodology advances from block 102 to block 104 and clears a synchronization timer or flag (not shown) of the refrigeration controller 16 and a last case flag. These flags are used to indicate that the synchronization is occurring and the number of refrigeration cases in the refrigeration system 10. The methodology then advances to block 106 and transmits the information from the refrigeration controller 16 via the communications bus 18 to the case controllers 38.

From block 106, the methodology advances to diamond 108 and determines whether a compressor from the rack of compressors 12 has just staged (e.g., turned ON or OFF), for example, by looking for a flag. If so, the methodology advances to block 109 and resets the synchronization timer to a cycle time such as two (2) minutes. The methodology then advances to diamond 108 previously described. If a compressor has not just staged, the methodology advances to block 110 and sets a predetermined variable X equal to the compressor suction pressure measured by the pressure sensor 30.

After block 110, the methodology advances to diamond 112 and determines whether the predetermined variable X is greater than a predetermined synchronization cut in pressure such as thirty-six (36) PSI stored in memory of the refrigeration controller 16. If not, the methodology advances to diamond 114 and determines whether the predetermined variable X is less than a predetermined synchronization cut out pressure such as thirty-two (32) PSI stored in memory of the refrigeration controller 16. If not, the methodology advances to the diamond 108 previously described.

In diamond 112, if the predetermined variable X is greater than the synchronization cut in pressure, the methodology advances to diamond 116 and determines whether the time on the synchronization timer is equal to a predetermined value such as zero (0) stored in memory 16. If not, the methodology advances to block 118 and decrements the synchronization timer to the predetermined value. The methodology advances to diamond 108 previously described. If the time on the synchronization timer is equal to the predetermined value, the methodology advances to diamond 120 and determines whether a more capacity needed flag is set. If not, the methodology advances to block 122 and sets a more capacity needed flag and clears a less capacity needed flag for the refrigeration system 10. The methodology then advances to block 124 and sets up to transmit this information from the refrigeration controller 16 via the communications bus 18 to the case controllers 38.

After block 124 or if the more capacity needed flag is set in diamond 120, the methodology advances to block 126. In block 126, the methodology calls the next case subroutine to be described in conjunction with FIGS. 2D and 2E and gets the next refrigeration case which is equal to N. It should be appreciated that if N equals 0, there are no more refrigeration cases. From block 126, the methodology then advances to diamond 128 and determines whether N is equal to a predetermined value such as zero (0) (e.g., no more cases). If so, the methodology advances to diamond 108 previously described. If not, the methodology advances to diamond 130 and determines whether the refrigeration case N is in its deadband range. It should be appreciated that each refrigeration case has a pre-programmed deadband range representing a cut in temperature such as thirty-eight degrees fahrenheit (38° F.) and a cut out temperature such as thirty-four degrees fahrenheit (34° F.).

If the refrigeration case N is in its deadband range, the methodology advances to block 132 and sets the synchronization timer to the maximum time. If the refrigeration case N is not in its deadband range or after block 132, the methodology advances to block 134 and sets a more capacity needed flag for the refrigeration case N. The methodology then advances to block 136 and sets a flag to inform the case controller 38 for the refrigeration case N. The methodology then advances to block 126 previously described.

In diamond 114, if the predetermined variable X is less than the synchronization cut out pressure, the methodology advances to diamond 138 and determines whether the time on the synchronization timer is equal to a predetermined value such as zero (0). If not, the methodology advances to block 140 and decrements the synchronization timer to the predetermined value. The methodology then advances to diamond 108 previously described. If the time on the synchronization timer is equal to the predetermined value, the methodology advances to diamond 142 and determines whether a less capacity needed flag is set. If not, the methodology advances to block 144 and sets a less capacity needed flag and clears a more capacity needed flag for the refrigeration system 10. The methodology then advances to block 145 and sets up to transmit this information from the refrigeration controller 16 via the communications bus 18 to the case controllers 38.

After block 145 or if the less capacity needed flag is set in diamond 142, the methodology advances to block 146. In block 146, the methodology calls the next case subroutine to be described and gets the next refrigeration case which is equal to N. It should be appreciated that if N equals 0, there are no more refrigeration cases. From block 146, the methodology then advances to diamond 148 and determines whether N is equal to a predetermined value such as zero (0). If so, the methodology advances to diamond 108 previously described. If not, the methodology advances to diamond 150 and determines whether the refrigeration case N is in its deadband range. If so, the methodology advances to block 152 and sets the synchronization timer to the maximum time. If the refrigeration case N is not in its deadband range or after block 152, the methodology advances to block 154 and sets a more capacity needed flag for the refrigeration case N. The methodology then advances to block 156 and sets a flag to inform the case controller 38 for the refrigeration case N. The methodology then advances to block 146 previously described.

Figure 3D:
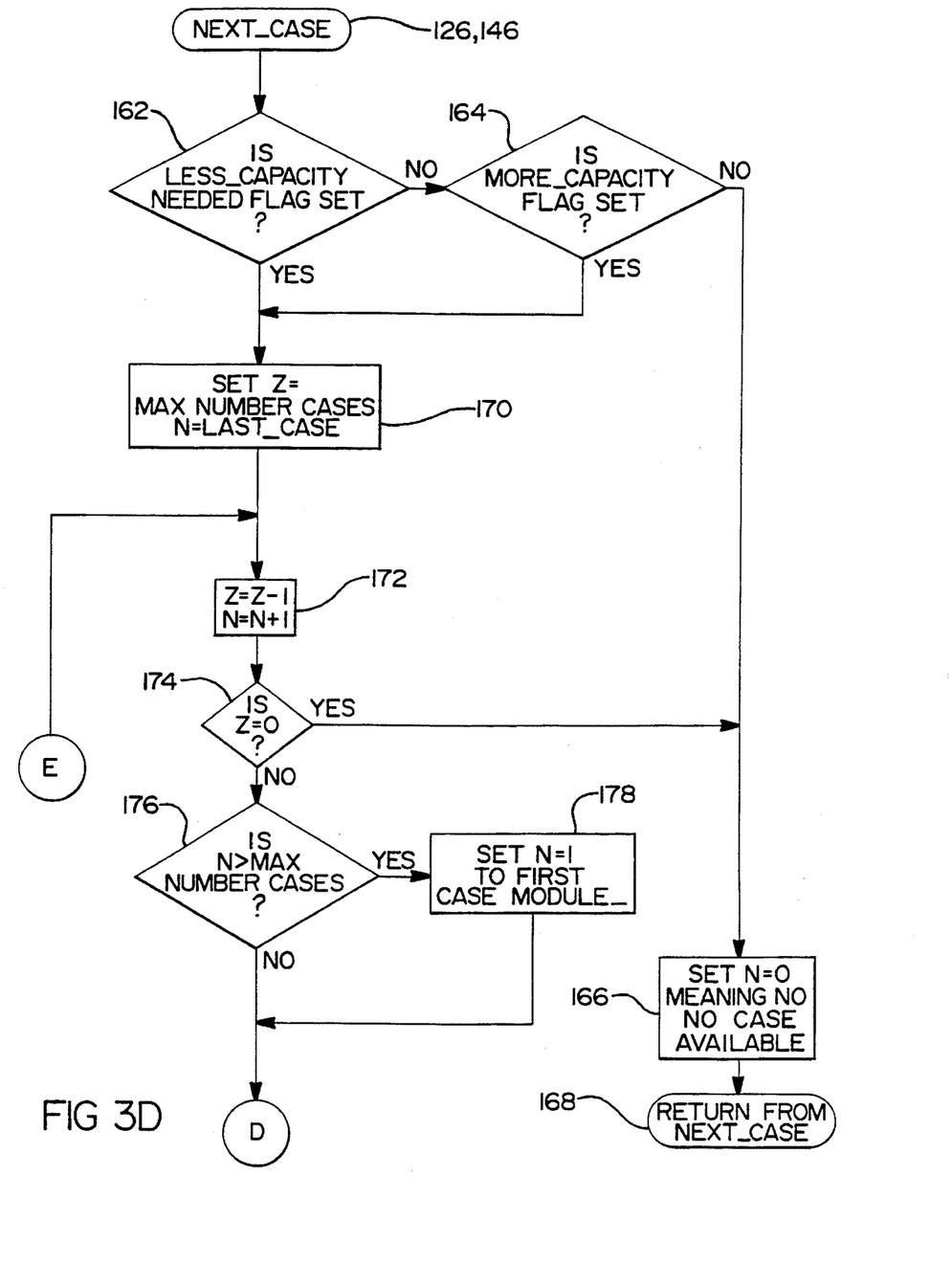
Figure 3E:
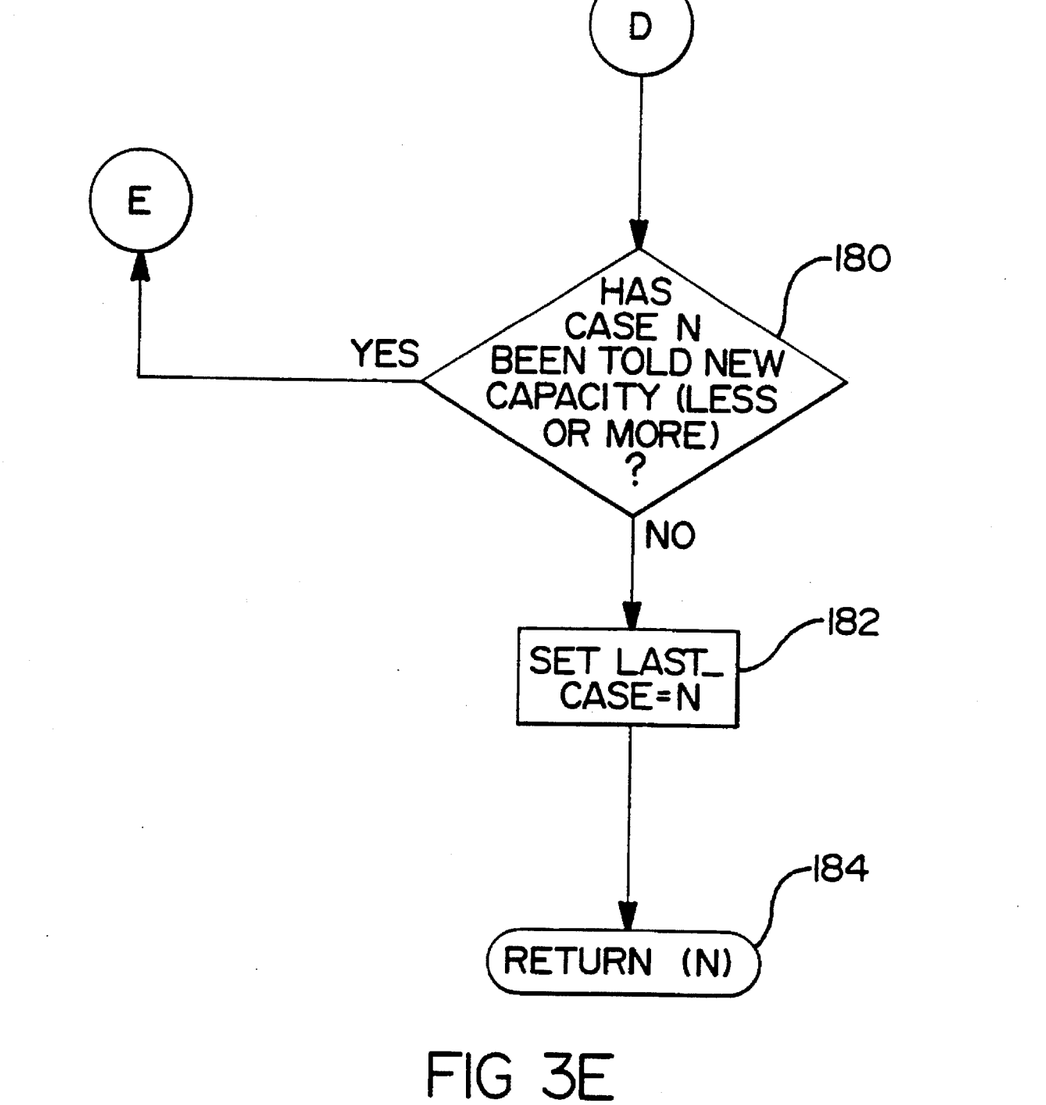

Referring to FIGS. 3D and 3E, the methodology for the next case subroutine of blocks 126 and 146 is shown. From blocks 126 and 146, the methodology advances to diamond 162 and determines whether the less capacity needed flag is set for the refrigeration system 10. If not, the methodology advances to diamond 164 and determines whether the more capacity flag needed is set for the refrigeration system 10. If the more capacity needed flag is not set, the methodology advances to block 166 and sets N equal to a predetermined value such as zero (0), meaning no refrigeration case is available. The methodology then advances to bubble 168 and returns.

In diamond 162 if the less capacity needed flag is set, or in diamond 164 if the more capacity needed flag is set, the methodology advances to block 170 and sets a predetermined variable Z equal to the maximum number of cases and the predetermined variable N equal to the last case. The methodology then advances to block 172 and sets the predetermined variable Z equal to Z minus 1 and the predetermined variable N equal to N plus 1. The methodology then advances to diamond 174 and determines whether the predetermined variable Z is equal to a predetermined value such as zero (0). If so, the methodology advances to block 166 previously described. If not, the methodology advances to diamond 176 and determines whether the predetermined variable N is greater than the maximum number of cases (predetermined variable Z). If so, the methodology advances to block 178 and sets the predetermined variable N equal to a predetermined value such as one (1) to indicate the first case controller 38.

In diamond 176 if the predetermined variable N is not greater than the maximum number of cases, or after block 178, the methodology advances to diamond 180 and determines whether the case controller 38 for the refrigeration case N has been told its new capacity (e.g., less or more needed), for example, by looking for a flag. If so, the methodology advances to block 172 previously described. If not, the methodology advances to block 182 and sets the last refrigeration case equal to the predetermined variable N. The methodology then advances to block 184 and returns to blocks 128 or 148.

An example of the operation of the methodology for the refrigeration system 10 is as follows:

In the refrigeration system 10, a rack of four compressors 12 may have a cut out (turn off) pressure of 32 PSI and a cut in (turn on) pressure of 40 PSI of compressor suction pressure. Six individual refrigeration cases (not shown) of the refrigeration system 10 may have cut out and cut in temperature values of the following:

| cases | cut in (T) | cut out (T) |
|---|---|---|
| case 1 | 38 | 34 |
| case 2 | 32 | 28 |
| case 3 | 39 | 35 |
| case 4 | 37 | 33 |
| case 5 | 20 | 16 |
| case 6 | 22 | 18 |

During normal operation, i.e., full pressure deadband control, the methodology simply turns ON another rack compressor 12 via the refrigeration controller 16 if the compressor suction pressure goes above the cut in pressure of 40 PSI. The methodology waits or delays a predetermined time interval, and if the compressor suction pressure is still above 40 PSI, the methodology turns ON another rack compressor 12. This staging continues until either all rack compressors 12 are ON, or the compressor suction pressure drops below the cut out pressure of 32 PSI. Similarly, when the compressor suction pressure goes below the cut out pressure of 32 PSI, and the predetermined time interval has timed out, the methodology turns OFF another rack compressor 12 until all rack compressors 12 have staged down or been turned OFF. Without synchronization in the methodology, the case controllers 38 would similarly turn ON and OFF at only the predetermined temperatures of each case. The case 1 controller 38 turns ON if the temperature of its refrigeration case gets above its cut in temperature of thirty-eight (38) degrees and stays ON until the temperature of that refrigeration case goes below its cut out temperature of thirty-four (34) degrees. It should be appreciated that the temperature area between thirty-eight (38) and thirty-four (34) degrees is the deadband area or range.

When using the full pressure deadband control described in the above example, with synchronization, the methodology determines that the refrigeration system 10 needs more capacity when the compressor suction pressure goes above the predetermined synchronization cut-in pressure which is, in this example, a predetermined value such as thirty-six (36) PSI; that is, the predetermined value may be the fifty percent (50%) point of the deadband range of eight (8) PSI (40–32 PSI) for the compressor suction pressure. The methodology causes the refrigeration controller 16 to scan the information from the case controllers 38 to find a refrigeration case controller 38 that has its output ON (e.g., requires more cooling), but is within its temperature deadband range. The methodology causes the refrigeration controller 16 to inform that case controller to shut OFF its load via its expansion valve 40, thus increasing the available capacity to the rack of compressors 12. If after one sixth of the staging time for the rack of compressors 12, the compressor suction pressure is still not below thirty-six (36) PSI, the methodology informs another case controller 38 that is in its temperature deadband range and has its output ON via its case controller 38, to terminate its load via its expansion valve 40 earlier than its normal cut out temperature. The methodology rotates through its refrigeration cases informing all the case controllers 38 in rotation of the need for more capacity while delaying only after terminating a refrigeration case load early. This continues until all refrigeration cases have been informed or until the compressor suction pressure goes below thirty-six (36) PSI. If the reduction in load of the refrigeration cases is not sufficient to go below thirty-six (36) PSI, and the compressor suction pressure gets above forty (40) PSI, the methodology will turn ON another rack compressor 12 via the refrigeration controller 16. If the synchronization is successful such that the compressor suction pressure goes below thirty-six (36) PSI, the methodology informs all the case controllers via the refrigeration controller 16 that no more capacity is needed and goes back to full pressure deadband control (e.g., without synchronization). Similarly if the compressor suction pressure gets below thirty-six (36) PSI, the methodology informs the case controllers 38 of the need for less capacity and turns ON the case controllers 38 that are within their deadband areas but presently not already ON. It should be appreciated that the methodology maintains or stores the first case controller 38 that went into capacity shed and the first case controller 38 that went into capacity storage so that it can rotate to another load to start the synchronization process at different case controllers 38 on the next need in that direction.

The affect on the case controller 38 would be a modification of its deadband area to affect the capacity of the refrigeration controller 16. When told by the refrigeration controller 16 that more capacity is needed by the rack of compressors 12, the case 1 controller 38 would disregard the cut out temperature and control to a single cut in setpoint. When told by the refrigeration controller 16 that the condition is gone, the case 1 controller 38 would go back to full hysterisis deadband control. When told by the refrigeration controller 16 that less capacity is needed by the rack of compressors 12, the case 1 controller 38 would disregard the cut in temperature and control to a single cut out setpoint. This will increase on/off cycling on the expansion valves 40 to reduce cycling of the rack of compressors 35.

Figure 4A:
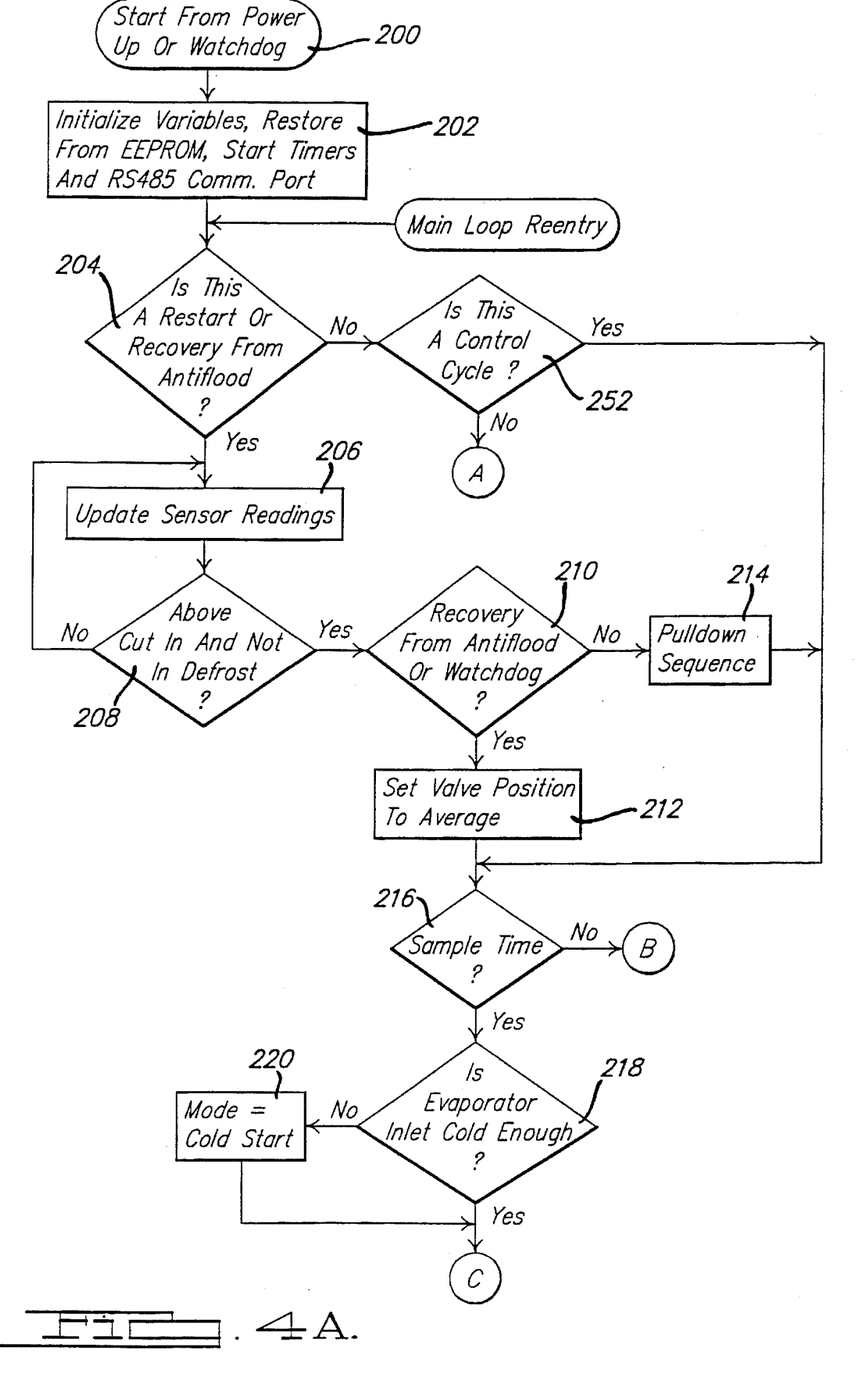
FIGS. 4A through 4D are flowcharts of another method, according to the present invention, of controlling the refrigeration system of FIG. 1.
Figure 4B:
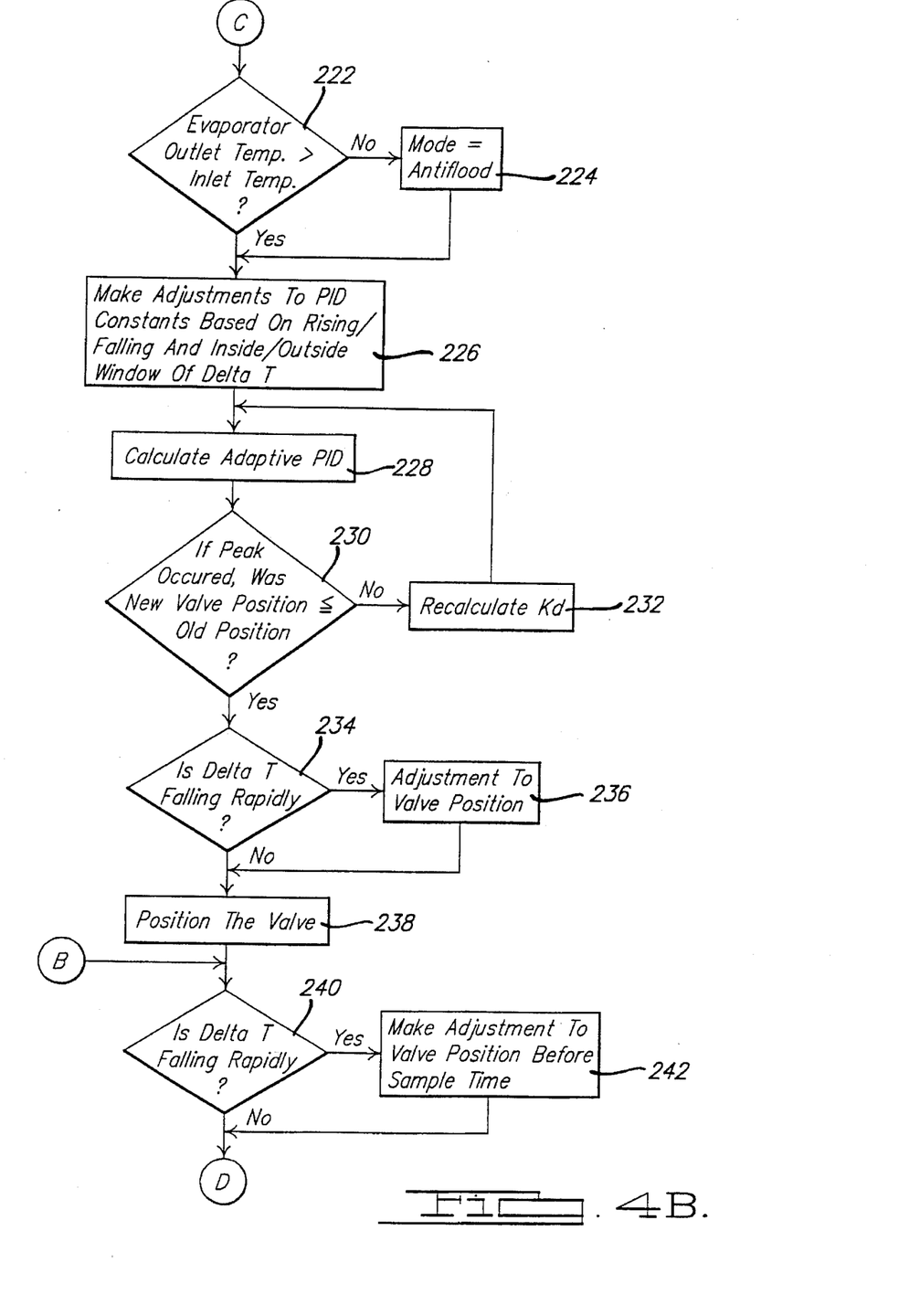
Figure 4C:
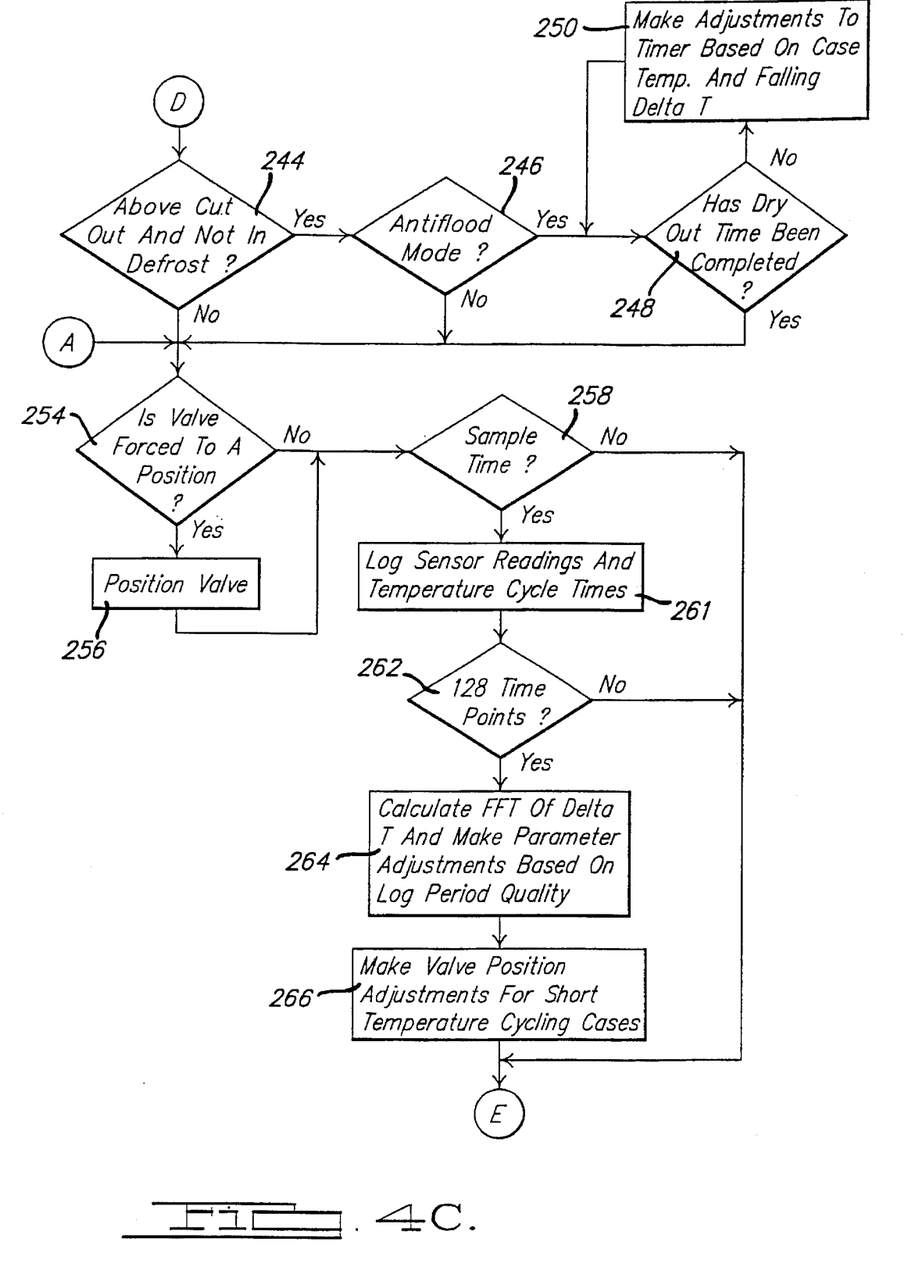

Referring to FIGS. 4A through 4C, a method, according to the present invention, for refrigeration case control is shown for refrigeration cases of the refrigeration system 10. The method controls the temperature across the evaporator coil of a refrigeration case. As illustrated in FIG. 4A, the methodology starts in bubble 200 and advances to block 202. In block 202, the methodology initializes predetermined variables, which are restored from the EEPROM 44, and start timers in the CPU 44 and initialize the communications bus 18 for all refrigeration cases. It should be appreciated that block 202 is not performed again when the methodology is called from a main control loop of the case controller 38.

The methodology advances from block 202 to diamond 204 and determines whether this is a restart or recovery from antiflood for a refrigeration case, for example, by looking for a flag set in block 224 to be described. If so, the methodology advances to block 206 and updates readings from the sensors 54,56 and stores these readings to memory 48 of the case controllers 38. From block 206, the methodology advances to diamond 208 and determines whether the temperature of the evaporator coil from the sensor 54 for a particular refrigeration case is both above the cut-in temperature and not in defrost. The CPU 44 compares the temperature readings from the sensor 54 of the evaporator coil to the cut-in temperature for that particular refrigeration case. If not, the methodology advances to block 206 previously described. If so, the methodology advances to diamond 210 and determines whether the recovery of the refrigeration case is from antiflood or watchdog, for example, by looking for a flag set in block 224 to be described. If so, the methodology advances to block 212 and sets the position of the expansion valve 40 for the refrigeration case to a predetermined average position. If not, the methodology advances to block 214 and initiates a pulldown sequence to be described. After blocks 212 and 214, the methodology advances to diamond 216 to be described.

In diamond 216, the methodology determines whether it is time to sample temperature readings from the sensor 54 of the evaporator coil of the refrigeration case, for example, by looking for a flag. If so, the methodology advances to diamond 218 and determines whether the inlet or coil in temperature of the evaporator coil is cold enough. The CPU 42 determines whether the inlet temperature of the evaporator coil is below a predetermined temperature such as the inlet pulldown temperature. If not, the methodology advances to block 220 and sets a mode of the refrigeration case equal to a cold start, for example, by setting a flag.

After block 220 or if the evaporator coil inlet temperature is cold enough in diamond 218, the methodology advances to diamond 222 and determines whether the outlet or coil out temperature of the evaporator coil is greater than the inlet temperature of the evaporator coil for the refrigeration case. The CPU 42 compares the outlet temperature of the evaporator coil to the inlet temperature of the evaporator coil for the refrigeration case. If not, the methodology advances to block 224 and sets the mode of the refrigeration case equal to antiflood, for example, by setting a flag.

After block 224 or if the evaporator coil outlet temperature is greater than the evaporator coil inlet temperature in diamond 222, the methodology advances to block 226 and makes adjustments to proportional integral differential (PID) constants based on rising/falling and inside/outside window of the temperature difference between the outlet temperature of the evaporator coil and the inlet temperature of the evaporator coil. The methodology then advances to block 228 and calculates an adaptive PID according to the following formula:

$$u(t) = K_p e(t) + K_i \int e\, dt + K_d \frac{de}{dt}$$

where:

u(t) is the control signal to the valve relative to current position;

e(t) is an error signal in the ΔT reading from its setpoint; and $K_p$, $K_i$ and $K_d$ are PID gain multipliers which are adjusted by adaptive tuning.

The methodology then advances to diamond 230 and determines, if a peak occurred, whether the new valve position for the expansion valve 40 is less than or equal to the old valve position for the expansion valve 40 of the refrigeration case. If not, the methodology advances to block 232 and recalculates $K_d$ so that the new valve position equals the previous. The methodology then advances to block 228 previously described.

In diamond 230, if a peak occurred and the new valve position was less than or equal to the old valve position for the expansion valve 40, the methodology advances to diamond 234 and determines whether the change in temperature, ΔT, for the evaporator coil is falling rapidly. If so, the methodology advances to block 236 and makes an adjustment to the position of the expansion valve 40 for the refrigeration case. If not, or after block 236, the methodology advances to block 238 and positions the expansion valve 40. It should be appreciated that the CPU 42 sends a signal to the output drivers 62, which positions the expansion valve 40.

After block 238 or if it is not time to sample in diamond 116, the methodology advances to diamond 240 and determines whether the change in temperature, ΔT, is falling rapidly as previously described for diamond 134. If so, the methodology advances to block 242 and makes an adjustment to the position of the expansion valve 40 for the refrigeration case before the sample time. After block 242 or if the change in temperature, ΔT, is not falling rapidly in diamond 240, the methodology advances to diamond 244. In diamond 244, the methodology determines whether the temperature of the evaporator coil for the refrigeration case is above the cutout temperature and not in defrost. The CPU 42 determines whether the temperature is below a predetermined temperature such as the inlet pulldown temperature. If so, the methodology advances to diamond 246 and determines whether the refrigeration case is in the antiflood mode, for example, by looking for a flag set in block 224. If so, the methodology advances to diamond 248 and determines whether a dryout time has been completed, for example, by looking at a timer in the CPU 42. The CPU 42 starts a timer at the beginning of the defrost cycle for the evaporator coil of the refrigeration case. If not, the methodology advances to block 250 and makes adjustments to the timer based on the temperature of the refrigeration case and negative change in temperature of the evaporator coil for the refrigeration case. The methodology then advances to diamond 248 previously described.

In diamond 204, if this is not a restart or recovery from antiflood, the methodology advances to diamond 252 and determines whether this is a control cycle of the refrigeration case, for example, by looking for a flag. If so, the methodology advances to diamond 216 previously described. If not, the methodology advances to diamond 254 to be described. Also, if the temperature of the evaporator coil is above the cutout temperature (out of defrost) in diamond 244, the methodology advances to diamond 254. Further, if the refrigeration case is not in an antiflood mode in diamond 246, the methodology advances to diamond 254. Additionally, if the dryout time has been completed in diamond 248, the methodology advances to diamond 254.

In diamond 254, the methodology determines whether the expansion valve 40 for the refrigeration case is forced to a position, for example, by looking for a flag. If so, the methodology advances to block 156 and positions the expansion valve 40 for the refrigeration case. After block 256 or if the expansion valve 40 is not forced to a position in diamond 254, the methodology advances to diamond 258 and determines whether it is time to sample temperature readings from the sensor 54 for the refrigeration case. If not, the methodology advances to diamond 268 in FIG. 4D to be described. If so, the methodology advances to block 261 and logs the temperature readings and temperature cycle times in memory 48 of the case controller 38 for the refrigeration case. The methodology then advances to diamond 262 and determines whether there has been a predetermined number of sample temperature time points, such as one hundred twenty-eight (128). If not, the methodology advances to bubble 260 previously described. If so, the methodology advances to block 264 and calculates a fast Fourier transform (FFT) of a waveform as a function of time created by sample temperature time points representing the change in temperature, $\Delta T$, for the evaporator coil and makes parameter adjustments based on the transformed waveform which represent the quality of the data gathered in the logging step. The methodology then advances to block 266 and makes valve position adjustments of the expansion valve 40 for short temperature cycling of the refrigeration case based on the parameter adjustments made in the previous step.

Figure 4D:
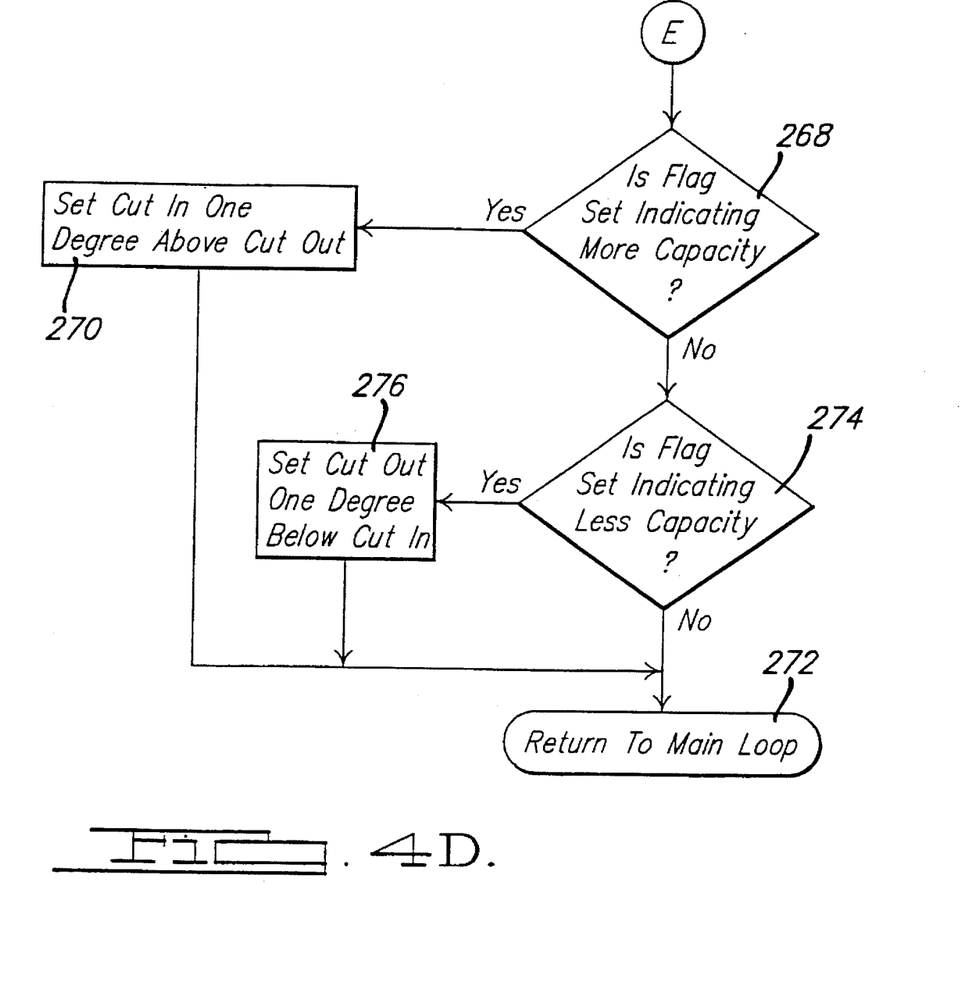

After block 266, the methodology advances to diamond 268 in FIG. 4D. In diamond 268, the methodology determines whether a more capacity needed flag is set for the refrigeration system 10. If so, the methodology advances to block 270 and sets the cut-in temperature limit one degree above the cut-out temperature limit for the refrigeration case. The methodology then advances to block and returns to the main loop of control for the refrigeration system 10.

In diamond 268, if the more capacity needed flag is not set, the methodology advances to diamond 274. In diamond 274, the methodology determines whether a less capacity needed flag is set for the refrigeration system 10. If so, the methodology advances to block 276 and sets the cut-out temperature limit one degree below the cut-in temperature limit for the refrigeration case. After block 276 or if the less capacity needed flag is not set in diamond 274, the methodology advances to block 272 and returns.

Accordingly, the method of refrigeration case control allows control of the refrigeration case even if the temperature sensors fail. The method of refrigeration case control provides control of an analog servo expansion valve for the refrigeration case. The method of refrigeration case control uses two fast fourier transforms to be self-tuning and therefore adaptive. The method of refrigeration case control allows closer temperature control of the refrigeration case within ± one degree (1°).

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of controlling a refrigeration case of a refrigeration system, the method comprising the steps of:

setting an expansion valve of a refrigeration case to a predetermined position;

moving the expansion valve of the refrigeration case out of the predetermined position;

sampling temperature readings from an evaporator coil of the refrigeration case;

calculating an adaptive proportional-integral-differential (PID) of the temperature of the evaporator coil for the refrigeration case; and moving the expansion valve to a second position closer to the predetermined position based on the calculated proportional-integral-differential until the temperature of the evaporator coil for the refrigeration case is within a predetermined temperature range.

2. A method as set forth in claim 1 including the step of determining whether the method is a restart or recovery from an antiflood of the evaporator coil.

3. A method as set forth in claim 2 including the step of updating temperature sensor readings if the method is a restart or recovery from an antiflood of the evaporator coil.

4. A method as set forth in claim 3 including the step of determining whether the temperature of the refrigeration case is above a predetermined cut-in temperature and repeating said step of updating if the temperature of the refrigeration case is not above the predetermined cut-in temperature.

5. A method as set forth in claim 2 including the step of determining whether the method is a control cycle if the method is not a restart or recovery from an antiflood of the evaporator coil.

6. A method as set forth in claim 3 including the step of determining whether the recovery was from an antiflood or watchdog if the temperature of the refrigeration case is above the predetermined cut-in temperature.

7. A method as set forth in claim 6 including the step of setting a position of the expansion valve to a predetermined average position if the recovery is from an antiflood or watchdog.

8. A method as set forth in claim 6 including the step of employing a pull down sequence if the recovery is not from an antiflood or watchdog.

9. A method as set forth in claim 1 including the step of determining whether an inlet of the evaporator coil is cold enough prior to said step of calculating.

10. A method as set forth in claim 9 including the step of setting a mode of the refrigeration case equal to a cold start if the inlet of the evaporator coil is not cold enough.

11. A method as set forth in claim 9 including the step of determining if an outlet temperature of the evaporator coil is greater than the inlet temperature of the evaporator coil if the inlet of the evaporator coil is cold enough.

12. A method as set forth in claim 11 including the step of setting a mode of the refrigeration case equal to antiflood if the outlet temperature of the evaporator coil is not greater than the inlet temperature of the evaporator coil.

13. A method as set forth in claim 11 including the step of making adjustments to PID constants based on rising/falling and inside/outside window of a change in temperature across the evaporator coil.

14. A method as set forth in claim 1 including the step of determining if a peak occurred and whether a new valve position of the expansion valve is less than or equal to an old valve position of the expansion valve.

15. A method as set forth in claim 14 including the step of recalculating $K_d$ if a peak occurred and the new valve position was not less than or equal to the old valve position.

16. A method as set forth in claim 14 including the step of determining whether the change in temperature across the evaporator coil was falling rapidly.

17. A method as set forth in claim 16 including the step of adjusting the position of the expansion valve if the change in temperature across the evaporator coil was falling rapidly.

18. A method as set forth in claim 17 including the step of determining whether the change in temperature across the evaporator coil was falling rapidly.

19. A method as set forth in claim 18 including the step of adjusting the position of the expansion valve before sample time if the change in temperature across the evaporator coil was falling rapidly.

20. A method as set forth in claim 18 including the step of determining whether the temperature of the refrigeration case is above a predetermined cut-out temperature.

21. A method as set forth in claim 1 including the step of determining whether it is time to sample temperature readings if the expansion valve is not forced to a position.

22. A method as set forth in claim 21 including the step of logging sensor temperature readings and temperature cycle times if it is time to sample temperature readings.

23. A method as set forth in claim 22 including the step of determining whether a predetermined number of temperature readings have been sampled.

24. A method as set forth in claim 23 including the step of transforming change in temperature data and making parameter adjustments based on transformed change in temperature data if a predetermined number of temperature readings have been sampled.

25. A method as set forth in claim 24 including the step of transforming the change in temperature data using a fast Fourier transform.

26. A method as set forth in claim 25 including the step of making adjustments to the valve position of the expansion valve.

27. A method of controlling a refrigeration case of a refrigeration system, said method comprising the steps of:

determining whether it is time to sample temperature readings from an evaporator coil of a refrigeration case;

determining whether an expansion valve of the refrigeration case is forced to a predetermined position if it is not time to sample temperature readings;

positioning the expansion valve of the refrigeration case if the expansion valve of the refrigeration case is forced to the predetermined position;

calculating an adaptive proportional-integral-differential (PID) of the temperature of the evaporator coil for the refrigeration case if it is time to sample temperature readings; and positioning the expansion valve for the refrigeration case until the temperature of the evaporator coil for the refrigeration case is within a predetermined temperature range.

* * * * *